(12) United States Patent
Pontoppidan et al.

(10) Patent No.: US 7,079,874 B2
(45) Date of Patent: Jul. 18, 2006

(54) TRANSFORMER HINGE DESIGN

(75) Inventors: Morten Pontoppidan, Greve (DK); Giovanni Ferranti, Broenshoej (DK); Ricky Barnett, Radlett (GB)

(73) Assignee: Nokia Corporation, Espoo (FI)

( * ) Notice: Subject to any disclaimer, the term of this patent is extended or adjusted under 35 U.S.C. 154(b) by 448 days.

(21) Appl. No.: 10/323,823

(22) Filed: Dec. 20, 2002

(65) Prior Publication Data

US 2004/0198412 A1    Oct. 7, 2004

(51) Int. Cl.
*H04B 1/38* (2006.01)

(52) U.S. Cl. ............................ 455/575.1; 455/550.1; 455/90.1; 379/433.13

(58) Field of Classification Search ............ 455/575.1, 455/550, 90.1, 568.3, 550.1; 379/433.13; 16/221, 223
See application file for complete search history.

(56) References Cited

U.S. PATENT DOCUMENTS

| 5,564,163 | A | | 10/1996 | Lowry et al. |
| 5,636,275 | A | | 6/1997 | Takagi et al. |
| 5,640,690 | A | * | 6/1997 | Kudrna ................. 455/575.3 |
| 5,649,309 | A | * | 7/1997 | Wilcox et al. ........... 455/575.3 |
| 5,732,135 | A | * | 3/1998 | Weadon et al. ........ 379/433.13 |
| 5,784,759 | A | | 7/1998 | King |
| 6,104,621 | A | * | 8/2000 | Weadon et al. ............. 361/814 |
| 6,115,886 | A | * | 9/2000 | Fujita ......................... 16/330 |
| 6,296,215 | B1 | | 10/2001 | McCoy et al. |
| 6,493,542 | B1 | * | 12/2002 | Frohlund ................... 455/90.1 |
| 6,678,539 | B1 | * | 1/2004 | Lu .......................... 455/575.1 |
| 6,859,978 | B1 | * | 3/2005 | Pan ............................ 16/308 |
| 6,865,778 | B1 | * | 3/2005 | Pan et al. .................... 16/330 |
| 2005/0107137 | A1 | * | 5/2005 | Byun et al. ............. 455/575.1 |
| 2005/0119023 | A1 | * | 6/2005 | Sudo et al. ................ 455/90.1 |
| 2005/0124392 | A1 | * | 6/2005 | Jeong ...................... 455/575.1 |

FOREIGN PATENT DOCUMENTS

EP    0 374 721    6/1990

* cited by examiner

*Primary Examiner*—Lana Le
(74) *Attorney, Agent, or Firm*—Alston & Bird LLP

(57) ABSTRACT

A mobile terminal, such as a mobile telephone, has a hinge with a helical spring and which provides both snap opening or automatic opening upon activation of a release means as well as a freely selectable angular position between the rotating parts of the terminal. Also, a new type of spring hinges or clutches are described for use in, for example, this type of terminal.

18 Claims, 3 Drawing Sheets

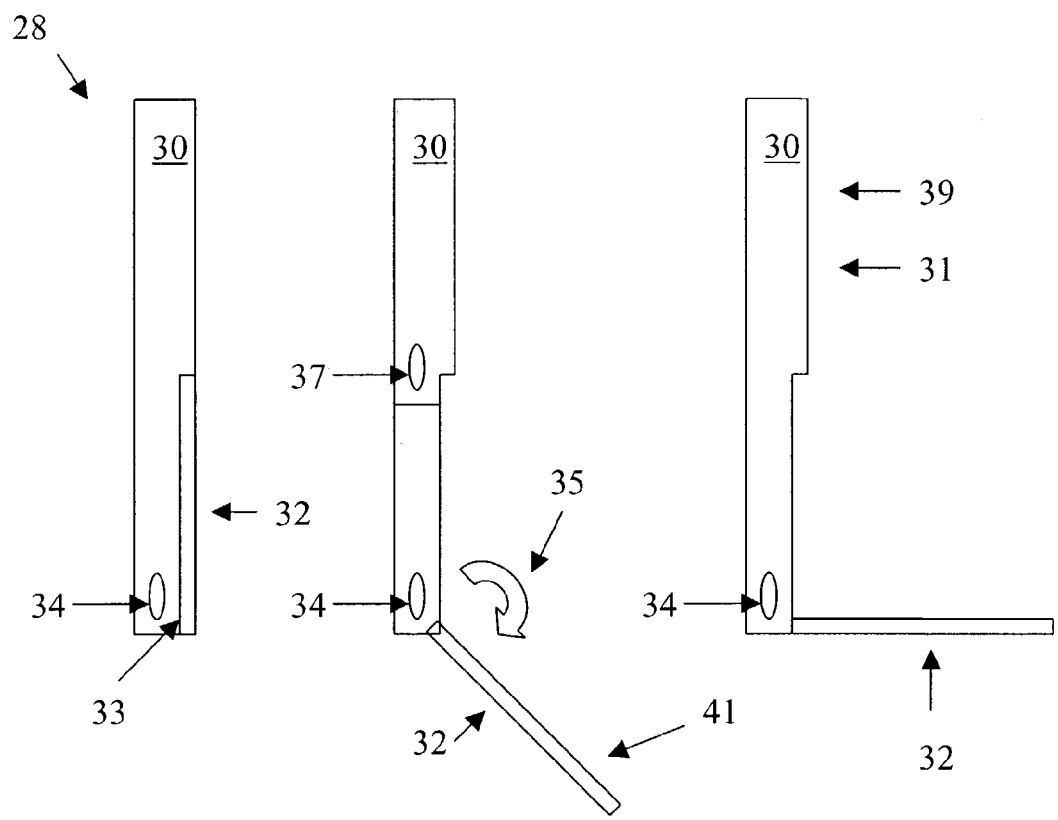
Fig. 9
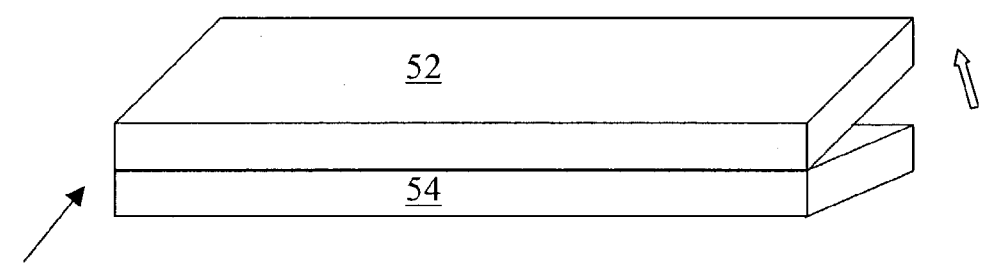
Fig. 10
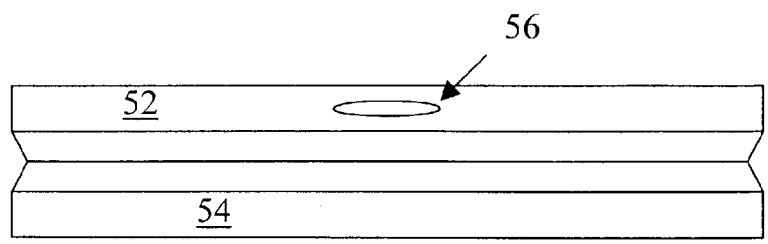

TRANSFORMER HINGE DESIGN

BACKGROUND OF THE INVENTION

1. Field of the Invention

The present invention relates to a hinge for a mobile terminal, such as a mobile telephone, and to a novel type of hinge, which may be used for mobile terminals.

2. Description of Prior Art

Presently, mobile terminals may be made as two-part terminals where the two parts are able to rotate in relation to each other from an inactive position to an active position. Some of these terminals have a snap opening function whereby the rotation to the active position is automatic upon activation of a button. However, due to the biasing, the active position and the inactive positions are the only positions maintainable. Thus, this brings about a problem when, for example, trying to position the terminal in a manner so that a display or the like may be visible.

It has been found that it is desirable to have, in a mobile terminal, a more freely selectable angle or rotation between such two parts.

SUMMARY OF THE INVENTION

Thus, in a first aspect, the invention relates to a mobile terminal having two parts connected to each other by a hinge, the hinge comprising:
  a helical spring having a longitudinal axis, the spring comprising one or more wound strands of material, each strand having two ends,
  a first hinge part extending into the helical spring, contacting an inner part of the helical spring at a first position or area along the longitudinal axis, and being connected to or attached to a first part of the two parts, and
  a second hinge part contacting the one or more strands of the helical spring and being connected to or attached to a second part of the two parts, the spring facilitating that:
  rotation of the first hinge part in a first direction around the longitudinal axis and in relation to the second hinge part will provide a first, lower friction between the first hinge part and the helical spring, and
  rotation of the first hinge part in a second direction, being opposite to the first direction, around the longitudinal axis and in relation to the second hinge part will provide a second, higher friction between the first hinge part and the helical spring the terminal further comprising:
  release means for increasing a diameter of the helical spring at the first position or area in order to reduce the second, higher friction between the first hinge part and the helical spring during rotation of the first hinge part in the second direction, the second, higher friction being reduced to a third friction, and
  biasing means for providing a rotation of the first hinge part in the second direction when the release means are operated, the biasing means providing a force exceeding a force required to overcome the third friction but being lower than a force required to overcome the second friction.

In this context, it should be noted that the hinge may have other, more standard, hinge means, whereby the present helical spring assembly may mostly be used as a rotatable clutch of the hinge.

A standard helical spring is normally made of only a single strand or elongated piece of the material (typically a metal or another stiff material). However, springs are contemplated being formed by a number of strands, the windings of which are positioned, one after the other, along the longitudinal axis of the spring.

Also, the helical spring needs only be formed by part of the strand(s). The ends of the strand(s) need not be part of the helical spring. These ends may be used for different purposes, such as immobilization or actual movement.

The normal manner of providing a wrap spring clutch is to have the two hinged or clutched elements extend into the spring and thereby engage the inner part of the spring. However, it should be noted that the same effect may be obtained by reversing the operation and engaging the spring at an outer side thereof. Thus, in order to loosen the engagement, the spring is then not loosened (diameter increased) but tightened (diameter reduced).

In this context, the first hinge part would normally extend into the spring from one end thereof and engage the inner side of the spring (at least in the clutched operation) along a position and area from that end and a predetermined distance into the spring along the axis. However, the part needs not contact the spring at the end but may do so at any position thereof.

The first hinge part preferably has, at the part extending into the spring, an at least substantially circular cross section corresponding to an inner cross section of the spring. In that manner, contact inside the spring may be a contact along the inner circumference of the spring.

The contact of the second hinge part and the spring may be an attachment or a biasing, depending on which type of movement of the spring the second hinge part is to prevent or brake.

If both the first and second hinge parts extend into the spring, the first and second hinge parts engage or contact the spring at different positions or areas along the longitudinal axis of the spring. The first hinge part extends into the spring, but the second one may engage an outer surface thereof, an inner surface thereof, or actually a part of the strand(s) not being part of the actual helical shape of the spring. This will become clearer below.

It is clear that friction is a manner of keeping two elements in a predetermined position until a force is experienced large enough to overcome the friction, where after rotation is obtained.

The operation and direction of the biasing force results in that the biasing means is not able to actually rotate the parts until the release means of the hinge is operated, whereby the second friction is reduced to the third friction. It is seen that the release thus provides a snap/automatic movement of the pertaining parts of the terminal. However, the hinge provides, at the same time, a freely selected rotational position of the two parts in that the biasing or snap action is only provided when the release means is operated.

In one embodiment, the spring comprises a non-helical part at an end of each of the one or more strands, and the second hinge part contacts only the non-helical part. Thus, the second hinge part does not actually extend into the spring and/or engage the inner part thereof. In this embodiment, the contact between the second hinge part and the non-helical part of the spring may be an attachment. Preferably, the first hinge member contacts at least substantially a full inner surface of the spring and/or extends a full length of the helical part of the spring (in the direction of the axis).

In another embodiment, one end of each of the strand(s) of the spring is fixed in relation to the second hinge part and the release means is adapted to displace the other end(s) of the strand(s) from a first position to a second position. In this embodiment, the release means are preferably adapted to not be rotated in relation to the second hinge part in order to facilitate the design of the release mechanism.

It may be desired to actually ensure that an accidental operation of the release means does not bring about rotation. Thus, the terminal could further comprise locking means for maintaining the parts in a predetermined rotational angle even when the release means are operated.

One manner of obtaining this displacement is one wherein the release means comprises, for each hinge, a wedge-shaped element adapted to be translated and thereby displace the end(s).

Another manner is one wherein the release means comprises, for each hinge, a flexible element engaging the end(s), the end(s) being adapted to bias the flexible element into a first, deformed state when in the first position, and the release means comprising means for bringing the flexible element into a first, regular state and thereby bringing the end(s) into the second position. This may be obtained when the flexible element is hollow and wherein the means for bringing comprise a means adapted to be translated into the hollowness of the flexible element. These bringing means may be translatable into and out of the flexible element and may be biased in a direction out of the hollowness so as to ensure that the end returns to the first position and that engagement is obtained between the first hinge part and the spring.

A second aspect of the invention relates to a hinge or a clutch for facilitating rotational movement of a first hinge part in relation to a second hinge part and around a rotational axis of the hinge, the hinge comprising:

a helical spring having a longitudinal axis along the rotational axis, the spring comprising one or more wound strands of material, each strand having two ends and a part extending outside the helical spring, the first hinge part extending into the helical spring, contacting an inner part of the helical spring at a first position or area along the longitudinal axis, and a second hinge part being attached only to the extending parts of each of the one or more strands of the helical spring, the spring facilitating that:

rotation of the first hinge part in a first direction around the longitudinal axis and in relation to the second hinge part will provide a first, lower friction between the first hinge part and the helical spring, and rotation of the first hinge part in a second direction, being opposite to the first direction, around the longitudinal axis and in relation to the second hinge part will provide a second, higher friction between the first hinge part and the helical spring.

Thus, the second hinge part does not contact the spring inside the helical part thereof—or at least does not contact the spring in the helical part. Contacting the spring at an end of the strands, such as ends not forming part of the helical spring but extend away there from, may render the mass production of this hinge or clutch more controllable.

Naturally, this hinge preferably comprises release means for increasing a diameter of the helical spring at the first position or area in order to reduce the second, higher friction between the first hinge part and the helical spring during rotation of the first hinge part in the second direction, the second, higher friction being reduced to a third friction Also, the hinge preferably further comprises biasing means for providing a rotation of the first hinge part in the second direction when the release means are operated, the biasing means providing a force exceeding a force required to overcome the third friction but being lower than a force required to overcome the second friction. In this situation, both the automatic rotation and the freely selectable position are possible.

In one embodiment, again, the release means comprises, for each hinge, a wedge-shaped element adapted to be translated and displace the end(s).

In another embodiment, the release means comprises, for each hinge, a flexible element engaging the end(s), the end(s) being adapted to bias the flexible element into a first, deformed state when in the first position, and the release means comprising means for bringing the flexible element into a first, regular state and thereby bringing the end(s) into the second position. This flexible element could be hollow and the means for bringing could then comprise a means adapted to be translated into the hollowness of the flexible element. Also, then the bringing means are preferably adapted to be translated into and out of the flexible element and are biased in a direction out of the hollowness.

A third aspect of the invention relates to a method of operating a mobile terminal according the first aspect of the invention, the method comprising:

operating the release means so as to have the biasing means rotate the first hinge part from an initial position in the second direction in relation to the second hinge means through a first angle to a second position, disengaging the release means, rotating the first hinge part in the second direction and through a second angle being smaller than the first angle to a third position, and allowing the hinge to maintain the first hinge part in the third position.

Thus, using this method, the automatic opening and the then freely selectable position is obtained.

BRIEF DESCRIPTION OF THE DRAWING

The invention will be explained more fully below, by way of example, in connection with preferred embodiments and with reference to the drawing, in which:

FIG. 9 illustrates three different positions or angles between a mobile telephone body and a movable part thereof, and FIG. 10 illustrates an embodiment different from that of FIG. 9.

DETAILED DESCRIPTION OF THE INVENTION

Figure 1:
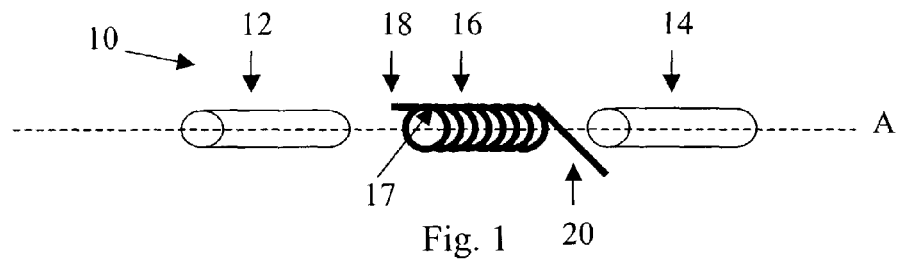
FIG. 1 illustrates the parts of a clutch/hinge.

FIG. 1 illustrates the basic elements of a known wrap-spring clutch/hinge. This hinge 10 comprises two rod members 12 and 14 and a helical spring 16 having an internal surface 17 and two strand ends 18 and 20. The diameters of the rod members 12 and 14 are larger than the internal diameter of the spring 16.

Figures 2, 3:
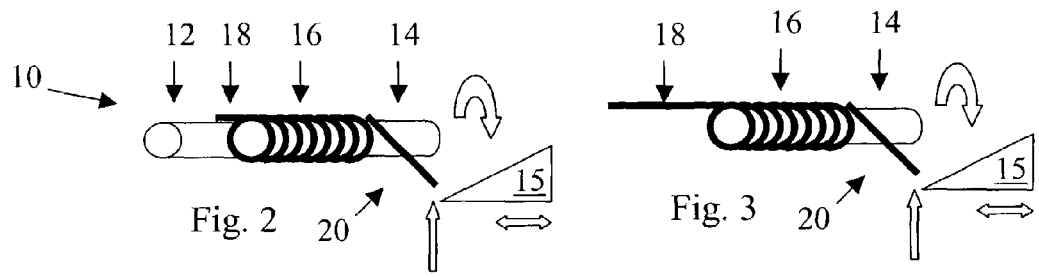
FIG. 2 illustrates the parts of FIG. 1 assembled to the hinge.
FIG. 3 illustrates a different embodiment of a hinge.

This hinge is assembled in FIG. 2 where the rod members touch inside the spring 16. It is clear that if the end 18 is kept fixed in relation to the rod member 12, rotation of the rod member 14 in the direction of the arrow will tighten the spring 16 and thus lock the two rod members 12 and 14 to each other so as to obtain maximum torque. In that manner, torsion or rotational energy is transferred from rod member 14 to rod member 12. On the other hand, if the rod member 14 was rotated in the other direction (opposite to the arrow), this movement will only loosen the spring 16, whereby almost no torque is transferred.

Also illustrated in FIG. 2 is a wedge 15 which may be used for moving the end 20 of the spring 16. If the wedge is moved so as to lift (on the figure) the end 20, the spring 16 will be "loosened" which means that the internal diameter thereof will increase so that the rod member 14 may now be moved in the direction of the fat arrow without tightening the spring 16 and transferring torque to the rod member 12.

In that manner, rotation of the member 14 in the direction of the fat arrow, around the longitudinal axis A, without operating the release wedge 15, a high friction is obtained due to the fact that the spring 16 will tighten. Rotation in the opposite direction of the member 14 will, on the other hand, incur a much lower friction due to the spring 16 loosening. Also, when operating the wedge 15, a third, low friction is experienced when rotating the member 14 in the direction of the fat arrow.

In FIG. 3, a different embodiment is illustrated which also has the rod member 14 and the spring 16 with the ends 18 and 20. However, the rod member 12 has been removed, and instead the element hitherto connected to the rod member 12 is attached to the end 18. As described above, this embodiment has certain advantages to the embodiment where the rod members abut in the spring 16. Preferably, the rod 14 now extends throughout the whole of the helical spring 16.

Figures 4, 5:
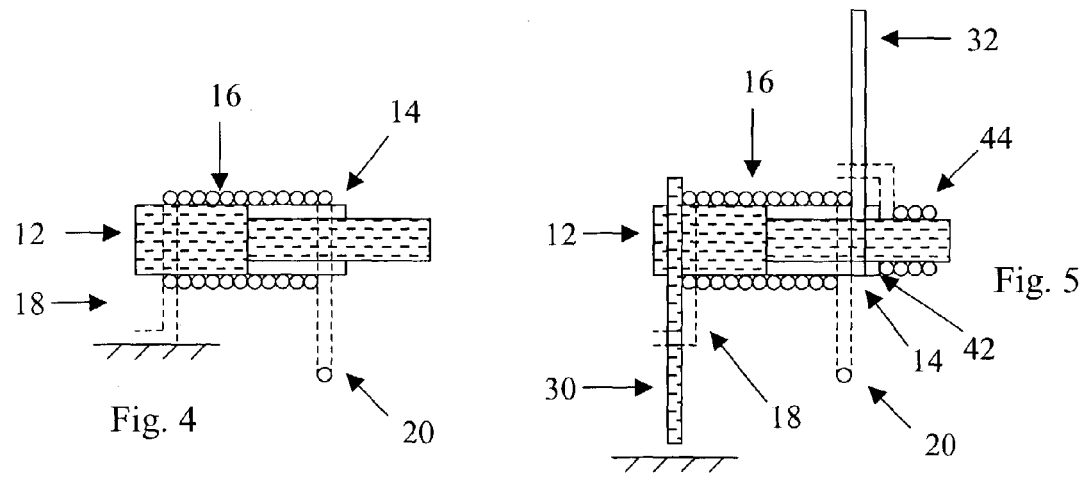
FIG. 4 is a cut-through view of yet an embodiment of a hinge.
FIG. 5, is a cut-through view of the hinge of FIG. 4 now also having a biasing spring.

FIG. 4 illustrates another embodiment of a hinge having the same function. This hinge also has a first rod member 12, the second rod member 14—now in the form of a tubular element extending over part of the rod member 12. The spring 16 has the "unlocking end" 20 and the end 18, which is now fixed to a fixed element.

In FIG. 5, the hinge of FIG. 4 has added elements 30 (fixed to the rod member 12 and in which the end 18 is fixed) and 32 (fixed to rod member 14) as well as a locking element 42 preventing the spring 16 from moving into a space between the rods 12 and 14 and creating backlash etc. in the system. It is seen that instead of immobilizing the end 18, the element 30 may be immobilized. Also, a biasing spring 44 is added having one end attached to the element 32 and the other (not illustrated) fixed to the rod member 12. Thus, it is clear that the element 32 and rod member 14 may be rotated over the rod member 12, this movement being biased by the biasing spring 44.

In this respect, it is preferred that the fixed end 18 and the wedge 15 (see also FIGS. 6 and 7) exist in the same system—meaning that these elements are not rotatable (but may be translatable) in relation to the rod member 12 or element 30. This will become clear from FIG. 8.

A number of choices exist when assembling the present hinge. Either the spring 16 is slightly opened before introducing the rods 12 and 14 (when the outer diameter of the rods is larger than the inner diameter of the spring) so as to obtain an engagement or friction there between in the un-operated situation (when the outer diameter of the rods is smaller than the inner diameter of the spring), so that operation may be a loosening of the spring 16. Alternatively, it may be desired to actually bias the end 20 in the un-operated situation, so that operation may be a tightening of the spring 16. In either way, it may be desired to bias the end 20 in the "tightening" direction in the un-operated situation.

Figures 6, 7:
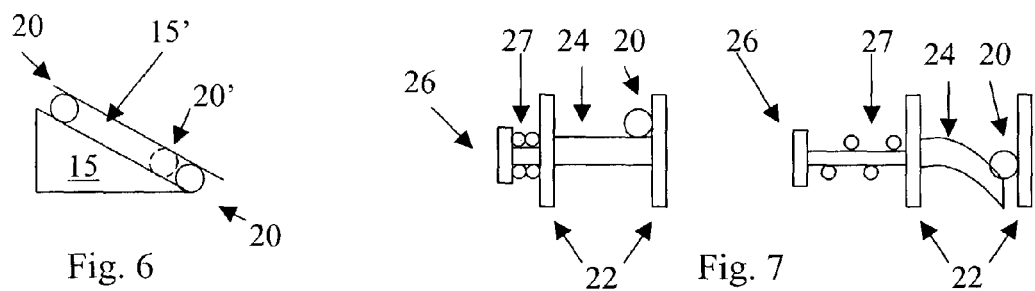
FIG. 6 illustrates one manner of loosening the helical spring.
FIG. 7 illustrates another embodiment of a manner of loosening the helical spring.

FIGS. 6 and 7 illustrate different manners of actually loosening the spring 16. In FIG. 6, the wedge 15 is illustrated together with two different positions of the end 20 of the spring 16. Depending on the distance between the wedge 15 and the helical part of the spring 16, this movement of the end 20 will provide more or less loosening of the spring 16.

In FIG. 6, the wedge 15 is supplemented by another element 15' forming, together with the wedge 15 a track in which the end 20 travels. This track may be used for actually biasing the end 20 in the tightening direction. This operation is seen as the un-biased position of the end 20 is illustrated by a dotted end 20'. Thus, moving the end 20 upwards will loosen the spring, and in the un-operated position, the end 20 is that depicted at the lower position, which is lower than the unbiased position 20'.

Another manner is seen in FIG. 7, where the end 20 rests against a flexible element 24 inside which an elongated, stiff element 26 may slide. It is seen that the end 20, in fact, is biased against the element 24 in such a manner that when the element 26 is retracted, the end 20 will deform the element 24 and thereby tighten the spring 16.

The element 26 is biased away from and out of the element 24 by a biasing spring 27, and the elements 26, 24 and 20 are controlled by holding means 22.

Returning to FIG. 2, it is clear that loosening of the spring 16 may be performed by moving the spring end 20 in a number of ways, such as in the direction of the fat arrow or in a direction along the end 20 toward the spring 16.

Figure 8:
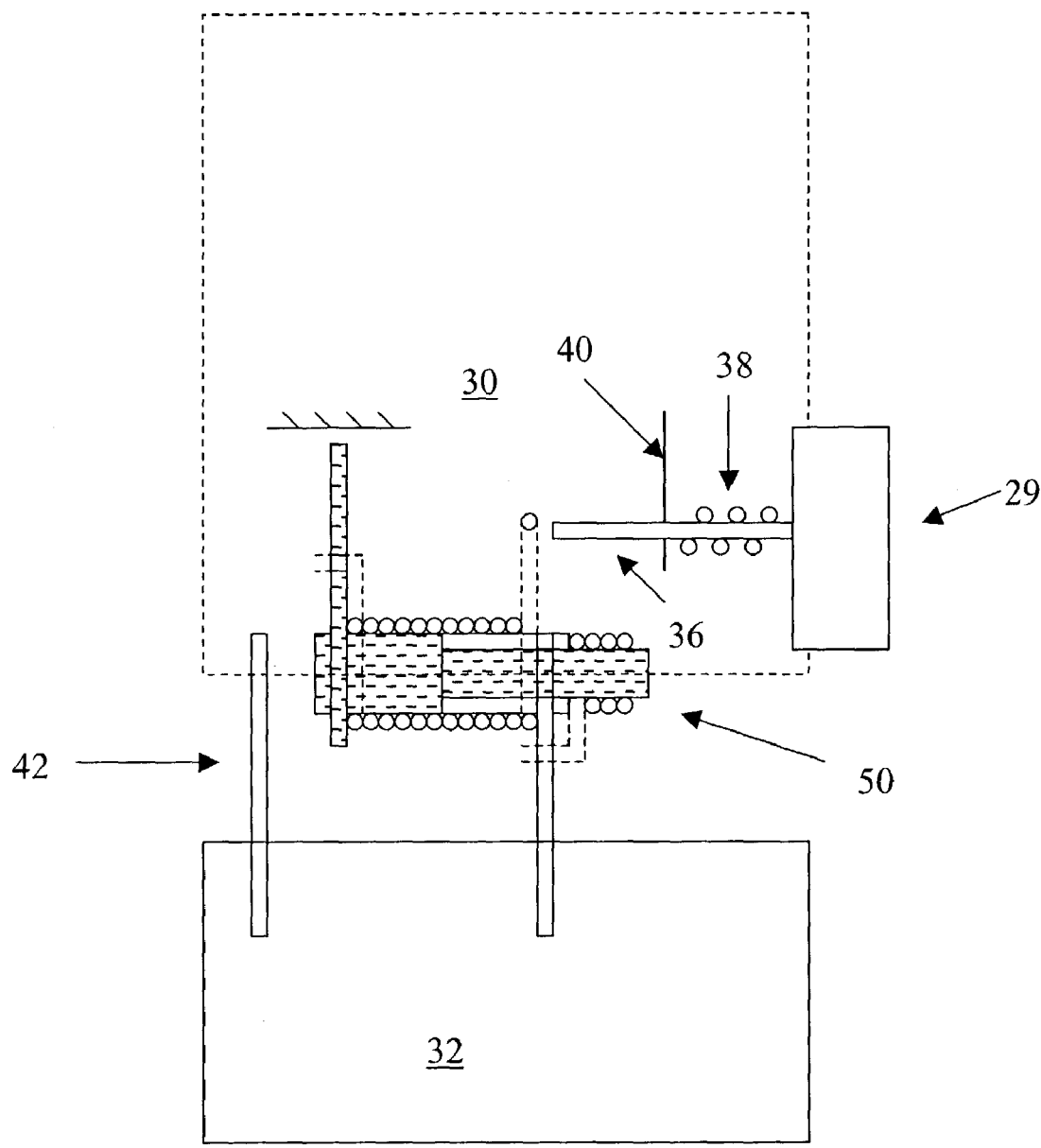
FIG. 8 illustrates a system having two parts, a hinge as seen in FIG. 5 and a spring loosening means.

FIG. 8 illustrates a two-part system having a first part 30 connected via a hinge 50 to a second part 32. The reference numerals from FIG. 5 have been omitted in order to retain the clarity of the figure.

The actual "direction" of the hinge (that is, the high friction and low friction rotation directions and the directions of the biasing springs) will depend on the actual embodiment. Two embodiments are described in relation to FIGS. 9 and 10.

The part 30 of the system of FIG. 8 has a spring loosening mechanism having a push button 29 connected to a loosening mechanism 36, such as the wedge 15, and being biased by a biasing spring 38 engaging a fixed element 40 in the part 30.

The first part 30 is further rotationally attached to the second part 32 by an element 42. This is only to stabilize the rotation of the parts.

In FIG. 9, the mobile telephone 28 has the first and second parts 30 and 32 as well as a hinge or clutch illustrated at 33, a release mechanism 34 for the hinge 33.

FIG. 9 illustrates three different angles between the first part 30 and the second part 32 and therefore a specific use of the mobile telephone 28.

In normal non-operative use, the mobile telephone 28 will be stored as illustrated in the left-most drawing where the first and second parts 30 and 32 are adjacent to each other. In the present embodiment, the second part 32 has a microphone 41 protected in the position in the left-most illustration. The telephone 28 also has a speaker 39 in the first part 30.

The hinge 33 is provided in the telephone 28 so that the rod member 14 is attached to the second part 32 and so that the rod member 12 and/or the end 18 is attached to the first part 30. Also, a release mechanism as that illustrated by the wedge 15 is operatively connected to the button 34. The spring 16 is directed so that the rotation in the direction of the fat arrow (see FIG. 2 or 3) will take place when rotating the second part 32 as illustrated by the fat arrow in the middle illustration of FIG. 9.

In order to operate the telephone 28, such as when wishing to make a telephone call, the second part 32 is rotated as illustrated by the fat arrow in the middle illustration. In this manner, the microphone becomes accessible. This activation is obtained by releasing the release mechanism 34, which loosens the spring 16 and allows the biasing means to overcome the third friction and rotate the second part 32 to, for example, a stopping position as that illustrated in the middle illustration. This position may be pre-defined as that providing the optimal position for use when making a telephone call. This position may also be one where the second part 32 is rotated further in the direction of the fat arrow.

Having obtained that position of the second part 32, the release button 34 is disengaged.

Having, for example, made the telephone call, it may be desired to have a different angle on the second part 32 such as in order for the telephone 28 to be able to stand up and present a display 31 thereof to the user. Thus, the second part 32 may be rotated in a direction opposite to that illustrated by the fat arrow. Due to the friction of the hinge 33—as well as the operation of the biasing means, the second part 32 will be substantially fixed and will be able to, for example, hold the telephone at the desired angle or in the desired position.

The telephone 28 may also have a locking means 37 for maintaining the second part 32 in the closed position even if the release button 34 is operated.

Naturally, the hinge may be reversed to that a snap closing is achieved by operating the button 34. Thus, the parts are rotated by hand (in the low friction direction of the hinge), and are maintained in that angular position until the button is operated, where after the biasing spring will close the parts again.

Finally, in FIG. 10, a further embodiment is seen at an angle from the back (above) and directly from the front (below). This embodiment 51 may also be a telephone or a palm computer having two parts 52 and 54 interconnected by a hinge (not illustrated) and having a release button 56 to be used as described above.

Thus, operation may be as described above: operation of the release button 56 may make the biasing means open the telephone/computer 51 for operation. Releasing the release button will make further rotation in the opening direction (the fat arrow) difficult (due to the high friction), but rotation in the opposite direction (the closing direction) will be easy.

Again, any desired angle between the parts may be obtained at the same time as a snap opening (the operation of the biasing means) may be obtained.

The present embodiments have centered on mobile telephones. However, the same functionality may be obtained in any type of element where a combination of an automatic opening of a device is desired combined with a subsequent, freely selected positioning of the elements. This may be in hand-held or palm-size electronic systems, portable computers or toys of any type.

What is claimed is:

1. A mobile terminal having two parts connected to each other by a hinge, the hinge comprising:
    a helical spring having a longitudinal axis, the spring comprising one or more wound strands of material, each strand having two ends;
    a first hinge part extending into the helical spring, contacting an inner part of the helical spring at a first position or area along the longitudinal axis, and being connected to or attached to a first part of the two parts; and
    a second hinge part contacting the one or more strands of the helical spring and being connected to or attached to a second part of the two parts;
    the spring facilitating that:
    rotation of the first hinge part in a first direction around the longitudinal axis and in relation to the second hinge part will provide a first, lower friction between the first hinge part and the helical spring, and
    rotation of the first hinge part in a second direction, being opposite to the first direction, around the longitudinal axis and in relation to the second hinge part will provide a second, higher friction between the first hinge part and the helical spring; and
    the terminal further comprising:
    release means for increasing a diameter of the helical spring at the first position or area in order to reduce the second, higher friction between the first hinge part and the helical spring during rotation of the first hinge part in the second direction; the second, higher friction being reduced to a third friction; and
    biasing means for providing a rotation of the first hinge part in the second direction when the release means are operated; and the biasing means providing a force exceeding a force required to overcome the third friction but being lower than a force required to overcome the second friction.

2. A mobile terminal according to claim 1, wherein the second hinge part extends into the helical spring, contacting the inner part of the helical spring at a second position or area along the longitudinal axis.

3. A mobile terminal according to claim 1, wherein the spring comprises a non-helical part at an end of each of the one or more strands, and where the second hinge part contacts the non-helical part.

4. A mobile terminal according to any of the preceding claims, wherein one end of each strand of the spring is fixed in relation to the second hinge part and wherein the release means is adapted to displace the end of each strand from a first position to a second position.

5. A mobile terminal according to claim 4, wherein the release means is adapted to not be rotated in relation to the second hinge part.

6. A mobile terminal according to claim 1, comprising locking means for maintaining the parts in a predetermined rotational angle even when the release means are operated.

7. A mobile terminal according to claim 1, wherein the release means comprises, for each hinge, a wedge-shaped element adapted to be translated and displace each end.

8. A mobile terminal according to claim 1, wherein the release means comprises, for each hinge, a flexible element engaging each end, each end being adapted to bias the flexible element into a first, deformed state when in the first position, and the release means comprising means for bringing the flexible element into a first, regular state and thereby bringing each end into the second position.

9. A mobile terminal according to claim 8, wherein the flexible element is hollow and wherein the means for bringing comprise a means adapted to be translated into hollow part of the flexible element.

10. A mobile terminal according to claim 8 or 9, wherein the means for bringing are adapted to be translated into and out of the flexible element and are biased in a direction out of hollow part of the flexible element.

11. A method of operating a mobile terminal according to claim 1, the method comprising:
operating the release means so as to have the biasing means rotate the first hinge part from an initial position in the second direction in relation to the second hinge means through a first angle to a second position;
disengaging the release means;
rotating the first hinge part in the second direction and through a second angle being smaller than the first angle to a third position; and
allowing the hinge to maintain the first hinge part in the third position.

12. A hinge for facilitating rotational movement of a first hinge part in relation to a second hinge part and around a rotational axis of the hinge, the hinge comprising:
a helical spring having a longitudinal axis along the rotational axis, the spring comprising one or more wound strands of material, each strand having two ends and a part extending outside the helical spring;
the first hinge part extending into the helical spring, contacting an inner part of the helical spring at a first position or area along the longitudinal axis; and
a second hinge part being attached to the extending parts of each of the one or more strands of the helical spring; and
the spring facilitating:
rotation of the first hinge part in a first direction around the longitudinal axis and in relation to the second hinge part will provide a first, lower friction between the first hinge part and the helical spring; and
rotation of the first hinge part in a second direction, being opposite to the first direction, around the longitudinal axis and in relation to the second hinge part providing a second, higher friction between the first hinge part and the helical spring.

13. A hinge according to claim 12, comprising release means for increasing a diameter of the helical spring at the first position or area in order to reduce the second, higher friction between the first hinge part and the helical spring during rotation of the first hinge part in the second direction, the second, higher friction being reduced to a third friction.

14. A hinge according to claim 13, comprising biasing means for providing a rotation of the first hinge part in the second direction when the release means are operated, the biasing means providing a force exceeding a force required to overcome the third friction but being lower than a force required to overcome the second friction.

15. A hinge according to any of claim 13 or 14, wherein the release means comprises, for each hinge, a wedge-shaped element adapted to be translated and displace each end.

16. A hinge according to any of claim 13 or 14, wherein the release means comprises, for each hinge, a flexible element engaging each end, each end being adapted to bias the flexible element into a first, deformed state when in the first position, and the release means comprising means for bringing the flexible element into a first, regular state and thereby bringing each end into the second position.

17. A hinge according to claim 16, wherein the flexible element is hollow and wherein the means for bringing comprise a means adapted to be translated into the hollowness of the flexible element.

18. A hinge according to claim 17, wherein the bringing means are adapted to be translated into and out of the flexible element and are biased in a direction out of the hollowness.

* * * * *